United States Patent [19]
Borrel et al.

[11] 3,725,457
[45] Apr. 3, 1973

[54] PRODUCTION OF ACETONITRILE

[75] Inventors: Marcel Borrel; Jacques Marion; Jean Metzger, all of Oullins, France

[73] Assignee: Ugine Kuhlmann, Paris, France

[22] Filed: Nov. 3, 1971

[21] Appl. No.: 195,514

Related U.S. Application Data

[63] Continuation of Ser. No. 819,980, April 28, 1969, abandoned.

[30] Foreign Application Priority Data

Apr. 26, 1968 France..............................68149679

[52] U.S. Cl. ..........260/465.1, 260/465.9, 260/465.3
[51] Int. Cl.....................C07c 121/18, C07c 121/32
[58] Field of Search..............260/465.1, 465.3, 465.9

[56] References Cited

UNITED STATES PATENTS

| | | | |
|---|---|---|---|
| 3,372,986 | 3/1968 | Sennewald et al. | 260/465.3 |
| 3,179,694 | 4/1965 | Van Eygen et al. | 260/465.9 |
| 3,009,943 | 11/1961 | Hadley et al. | 260/465.3 |
| 2,691,037 | 10/1954 | Bellringer et al. | 260/465.9 |
| 3,094,552 | 6/1963 | Wood | 260/465.9 |
| 3,152,170 | 10/1964 | Barclay et al. | 260/465.3 |
| 3,210,295 | 10/1965 | Modiano | 260/465.3 X |

Primary Examiner—Joseph P. Brust
Attorney—Alfred L. Haffner, Jr. et al.

[57] ABSTRACT

Process for the preferential formation of acetonitrile in vapor phase ammoxidation of acrolein or products producing acrolein by carrying out the reaction at a relatively low temperature and at a high ammonia to acrolein ratio.

5 Claims, No Drawings

PRODUCTION OF ACETONITRILE

This application is a continuation of earlier copending application Ser. No. 819,980, filed Apr. 28, 1969, now abandoned.

BACKGROUND OF INVENTION

This invention relates to the preferential production of acetonitrile by the ammoxidation of acrolein or a precursor for acrolein under specific conditions such that the amount of acetonitrile produced is at least twice the amount of acrylonitrile produced.

It is well known that the oxidation of acrolein in the presence of ammonia leads to the corresponding unsaturated nitrile (acrylonitrile) according to the overall reaction $$CH_2=CH-CHO+NH_3+\tfrac{1}{2}O_2 \rightarrow CH_2=CH-CN+2H_2O$$

and various catalysts have been proposed which make it possible to obtain at a relatively elevated temperature the complete or almost complete conversion of acrolein into acrylonitrile. For example, in French Pat. No. 1,410,967 of the 19th Feb. 1963, a mixture of acrolein, ammonia, air and possibly an inert gas, for example steam, is passed over a catalyst consisting of one or more salts containing oxygen of arsenic and less electronegative elements between 200° and 450°C. Under these conditions the effluent gases contain acrylonitrile, unconverted ammonia and hydrocyanic acid. There is no mention in the patent of the presence of acetonitrile amongst the products produced.

According to German Pat. No. 1,070,170 which issued on May 3, 1954 the reaction is carried out over a catalyst which is molybdenum or a compound containing molybdenum at a temperature between 350°C. and 450°C. According to the description of the process the resulting mixture consists of acrylonitrile, hydrocyanic acid, oxides of carbon and unconverted ammonia.

According to U.S. Pat. No. 3,094,552 the operation is carried out over a catalyst based on compounds of tin and antimony at elevated temperature, preferably between 300°C. and 550°C. Here again, the resulting mixture is described as one containing acrylonitrile, unconverted ammonia, hydrocyanic acid and oxides of carbon.

In the descriptions of numerous processes of this kind mention is made of the existence of numerous secondary reactions which lead to the formation of small quantities of by-products such as: acetonitrile, propionitrile, butene-nitriles, nitriles with five carbon atoms or less, various alcohols, for example, alkyl alcohols such as butanols. The presence of these by-products poses difficult problems for the separation of pure acrylonitrile. Certain of the by-products may be isolated in a satisfactory degree of purity and are sufficiently valuable to warrant doing so. Acetonitrile is one of these, but as the reactions are normally carried out it is produced in only small quantities and it is difficult to separate it from the relatively large quantities of acrylonitrile produced. One special difficulty is that the separation and purification of acetonitrile requires the use of very high volume separation vessels compared to the volume of acetonitrile actually recovered.

An object of this invention is to improve the procedure for the ammoxidation of acrolein or products which liberate acrolein under the conditions of the ammoxidation reaction so as to produce a major proportion of acetonitrile rather than, as is the usual case, a major proportion of acrylonitrile.

The Invention

It has been found that the ammoxidation of acrolein or a precursor for acrolein, in the presence of ammonia may be carried out in such a way that the principal product of the reaction is acetonitrile. The principal reaction which takes place may be represented as follows:

$$2CH_2=CH-CHO+3O_2+2NH_3 \rightarrow 2CH_3-CN+2CO_2+4H_2O$$

The reaction is carried out in the vapor phase at a temperature of from about 200°C. to 350°C. in the presence of more ammonia than is normally used for the production of acrylonitrile.

In ammoxidation reactions for the production of acrylonitrile the usual ammonia to acrolein ratio is from about 1 : 1 to 1.1 : 1 and the temperature is about 400°C. It has now unexpectedly been discovered that by decreasing the temperature and increasing the ammonia to acrolein it is possible to produce reaction mixtures containing at least twice as much acetonitrile as acrylonitrile, and often as much as ten or more times of the former.

The ammoxidation catalysts generally utilized in the production of acrylonitrile may also be employed in the practice of this invention. These include a metallic oxide or mixtures of oxides, for example, oxides of molybdenum, antimony, bismuth or tin; and these may be employed in admixture with at least one of the oxides of metals such as iron, uranium, copper, vanadium or tungsten. The catalyst, as is known, may be a mixture of oxides, such as antimony and tin oxides, or may in fact be a metallic compound such as one containing antimony, tin and oxygen. In any event, they may be regarded as containing or consisting of oxygen and the metal or metals.

Catalysts which are based on oxides of tin and antimony are especially useful, and those in which the antimony to tin ratio is from about 6 : 1 to 0.1 : 1 are preferred for reasons of economy and yield.

The catalyst may be supported or unsupported, and may be employed in a fixed or fluid bed in accordance with standard procedures.

As in the usual case, the reaction can be carried out in the presence of steam or an inert gas such as nitrogen.

The reaction mixture normally contains from about 1 percent to 10 percent, preferably 0.5 to 5 percent acrolein by volume; 20 percent to 80 percent, preferably 25 percent to 60 percent air; 0 to 70 percent, preferably 35 percent to 65 percent steam; the molar ratio of ammonia to acrolein being from about 1.5 : 1 to 10 : 1, preferably 2 : 1 to 6 : 1. The preferred ranges given above are based on the desiderata of obtaining the best yields which are consistent with the most economical reaction time and temperature.

The acrolein may be introduced into the initial mixture in the free state or in the form of a product which permits of its formation under the reaction conditions. If a product which liberates acrolein is used, a sufficient quantity should be employed so that the resulting ammonia-acrolein ratio is within the range defined above. The cyanhydrin of acrolein or unsaturated hydrocarbons such as propylene may be employed as starting materials. The process of the application is particularly important since it affords a commercial utility for the cyanhydrin of acrolein which is formed by way of by-product in the normal industrial processes for the production of acrylonitrile from propylene.

The gaseous mixture leaving the reactor may be complex. It generally contains unconverted ammonia and may also contain acrolein, carbon oxides and other by-products such as acrylonitrile, acetaldehyde, hydrocyanic acid (particularly when the initial mixture contains the cyanhydron of acrolein or its dissociation products) and finally unconverted initial products.

This mixture may be separated using the known separation processes for complex mixtures containing nitriles, these processes including gas washings, simple distillations, extractive distillations, azeotropic separations and/or drying operations. It may be convenient to mix the effluent gases from a reactor operating in the conventional manner for the production of acrylonitrile from propylene with the gases coming from a reactor operating according to the present invention and to separate the acetonitrile and acrylonitrile from the resulting mixture.

The following non-limiting examples are given by way of illustration only.

Example 1

Into a catalysis reactor containing a catalyst consisting of oxides of tin and antimony (atomic ratio Sb/Sn = 4/1) obtained by treating the metals with nitric acid there is introduced 112 gms. per hour of acrolein with air, ammonia and steam. The gaseous mixtures entering the reactor have the following composition by volume:

| | |
|---|---|
| acrolein | 3.5% |
| steam | 39.5% |
| air | 50% |
| ammonia | 7% |

The reaction temperature is 280°C.
The effluent gases contain, by volume:

| | |
|---|---|
| acetonitrile | 45% |
| acetaldehyde | 15% |
| acrylonitrile | 2.5% |
| $CO + CO_2$ | 18% |
| hydrocyanic acid | 1.5% |

18% of the acrolein remains unaffected.

The acetonitrile and acrylonitrile are separated using the usual extraction distillation procedures.

Example 2

Into a reactor containing a tin oxide/antimony oxide catalyst with atomic ratio Sb/Sn of 4/1 there are introduced the dissociation products of 64 gms/hr. of cyanhydrin of acrolein by steam together with air, ammonia, and steam so as to produce a gaseous mixture of the following composition, by volume:

| | |
|---|---|
| acrolein | 2.5% or 0.52 moles/hr. |
| hydrocyanic acid | 2.5% |
| steam | 53.05% |
| air | 35.7% |
| ammonia | 6.25% |

The rates of conversion of acrolein fed in the form of cyanhydrin are as follows:

| | |
|---|---|
| acetonitrile | 53.2% |
| acetaldehyde | 12% |
| acrylonitrile | 3.3% |
| CO | 4.5% |
| $CO_2$ | 13% |

14 percent of the acrolein remains unconverted. A total of 98 percent of the hydrocyanic acid introduced in the form of cyanhydrin is collected, the rest being oxidized into CO and $CO_2$. The acetonitrile is separated by extractive distillation.

Example 3

Into a reactor containing a catalyst which is a mixture of antimony oxide, tin oxide and iron oxide in the molar ratio of 3 parts antimony oxide, one part tin oxide and 0.5 part iron oxide, there is introduced continuously the product resulting from the dissociation of 78 grams per hour of the cyanhydrin of acrolein with water vapor, air, ammonia, in such a proportion as to produce a gaseous mixture having the composition, by volume:

| | |
|---|---|
| acrolein | 3% |
| hydrocyanic acid | 3% |
| water vapor | 50.7% |
| air | 37.8% |
| ammonia | 5.5% |

The temperature is 330°C.

The analysis of the reaction product based on acrolein introduced in the form of its cyanhydrin is as follows:

| | |
|---|---|
| acetonitrile | 42% |
| acetaldehyde | 8.5% |
| acrylonitrile | 15.5% |
| $CO + CO_2$ | 24% |
| unconverted | 10% |

Afterwards, the acetonitrile is extracted by a water washing followed by several extractive distillations.

We claim:

1. In a process for the ammoxidation of acrolein in which acrolein in the vapor phase is contacted with an ammoxidation catalyst at an elevated temperature in the presence of ammonia and oxygen to produce a mixture of acrylonitrile and acetonitrile, the improvement which comprises carrying out the reaction at a temperature of from about 200°C to 350°C, the ammoxidation catalyst being an oxide of tin and antimony or an oxide of tin and antimony together with an oxide of iron, uranium, copper, vanadium, or tungsten, at a molar ratio of ammonia to acrolein of from 1.5:1 to 10:1, thereby to produce at least twice as much acetonitrile as acrylonitrile.

2. A catalyst as in claim 1 wherein the antimony to tin ratio is from 6 : 1.

3. A process as in claim 1 wherein the ammonia to acrolein ratio is from 2 : 1 to 6 : 1.

4. A process as in claim 1 wherein the acrolein is obtained from acrolein cyanohydrin under the reaction conditions.

5. A process according to claim 1 wherein the reaction is carried in the presence of steam or an inert gas.

* * * * *